United States Patent [19]

Gutzmer

[11] Patent Number: 5,455,859
[45] Date of Patent: Oct. 3, 1995

[54] TELEPHONE HANDSET INTERFACE FOR DEVICE HAVING AUDIO INPUT

[76] Inventor: Howard A. Gutzmer, 4335 Grace Rd., Bonita, Calif. 91902

[21] Appl. No.: 345,947

[22] Filed: Nov. 28, 1994

[51] Int. Cl.⁶ .................................................. H04M 9/00
[52] U.S. Cl. .............................. 379/442; 379/93; 379/394
[58] Field of Search ..................................... 379/442, 443, 379/444, 387, 394, 398, 98, 399, 96, 100, 93; 370/118

[56] References Cited

U.S. PATENT DOCUMENTS

| | | | |
|---|---|---|---|
| 4,825,465 | 4/1989 | Ryan | 379/399 |
| 4,864,567 | 9/1989 | Giorgio | 370/118 |
| 4,907,267 | 3/1990 | Gutzmer | 379/442 |
| 4,951,312 | 8/1990 | Tanikawa et al. | 379/399 |
| 4,989,243 | 1/1991 | Choi | 379/399 |
| 5,133,006 | 7/1992 | Khuat | 379/399 |

*Primary Examiner*—Jeffery A. Hofsass
*Assistant Examiner*—Scott Wolinsky
*Attorney, Agent, or Firm*—Brown, Martin, Haller & McClain

[57] ABSTRACT

An interface between a telephone handset and an external device having both data and audio inputs and outputs, such as a voice-over-data modem, allows a user to speak and listen through the handset of the telephone instrument. The interface also allows a voice-over-data modem to be connected to a PBX-type telephone system. The interface includes a filter circuit that allows the audio-frequency signal generated by the handset microphone to pass through to the external device while blocking DC along that path. The circuit also allows the DC bias voltage provided by the telephone base to pass through to the handset microphone while blocking audio-frequency signals on that path. The interface may also include a switching circuit that forms direct electrical connections between the telephone handset and the telephone base when the external device is not in a mode in which it can communicate data, e.g., when a voice-over-data modem is in an on-hook state.

16 Claims, 2 Drawing Sheets

TELEPHONE HANDSET INTERFACE FOR DEVICE HAVING AUDIO INPUT

BACKGROUND OF THE INVENTION

The present invention relates generally to a telephone handset interface for a device having an audio input and, more specifically, to an interface for coupling a modem to a telephone instrument.

A modem is a telecommunications device that is used for interfacing a computer, facsimile machine or similar data device with a telephone line to enable the data device to communicate with another like device over the telephone line. A modem typically has a data connection to the computer or other data device and a two-wire RJ-11 telephone connector for connecting the modem to the telephone line.

Practitioners in the art have developed voice-over-data modems. In addition to the data connection and the telephone connection, a voice-over-data modem has a voice connection to a headset, a telephone-like handset, or other microphone/speaker pair. The modem allows a user to send or receive data over the telephone line while simultaneously speaking or listening to the other party over the same telephone line. The other party must have a compatible voice-over-data modem.

A microphone is typically designed to operate properly at a specific DC voltage level. Microphone elements of different headsets and telephone handsets, especially those produced by different manufacturers, may operate at different voltage levels. Therefore, a voice-over-data modem manufacturer may provide a handset or headset having a microphone element that is compatible with its modem. Nevertheless, the user may desire to use a different handset or headset. For example, the manufacturer may provide only a headset, and the user may desire to use a handset.

A modem, whether data-only or voice-over-data, cannot easily be connected to a PBX or office-type telephone system. The problem is described U.S. Pat. No. 4,907,267, issued to Gutzmer, entitled "MODEM INTERFACE DEVICE." In a PBX telephone system, multiple lines are serviced by a central controller. It is difficult to achieve dedicated line service for a modem because the telephone line to which a particular telephone instrument is connected carries line selection information and power in addition to the audio frequency communication signal of the handset. To solve this problem, the above-referenced U.S. patent describes a solution in which a modem is connected to the telephone system via the handset jack of the telephone instrument. The patent describes an interface device that allows a user to switch between voice and data communication. To use the interface device, both the modem and the handset that was unplugged from the telephone instrument are plugged into the device. The device is then plugged into the handset jack of the telephone instrument base. The device has a switch that allows the user to selectively connect either the handset or the modem to the handset jack. The interface device converts the two-wire modem connection to the four-wire handset connection using a transformer. The transformer also provides impedance matching.

Although a handset or headset can be connected directly to a voice-over-data modem, the voice-over-data feature does not obviate the need for a two-wire to four-wire conversion or the need for impedance matching to successfully interface the modem to a PBX telephone system via the handset jack of a telephone instrument base.

These problems and deficiencies are clearly felt in the art and are solved by the present invention in the manner described below.

SUMMARY OF THE INVENTION

The present invention comprises an interface between a telephone handset and an external device having an audio input, such as a computer or a computer peripheral such as a voice-over-data modem. The interface allows the microphone portion of the handset of the telephone instrument to be used as an audio source for the external device. The interface may also allow the speaker portion of the handset to be used as an audio output. An important advantage of the invention is that it allows a voice-over-data modem to be connected to a PBX or office-type telephone system.

The interface comprises a telephone handset connector having an input, a device audio connector having an output, and a telephone base connector having an output and an input. The interface forms a path carrying audio-frequency signals between the handset connector and the device audio connector. The interface also isolates the handset connector from the telephone base connector at audio frequencies, but routes the DC bias voltage from the telephone base connector to the handset microphone element. The handset microphone element thus receives the proper DC bias voltage to enable proper voice communication with the external device.

The present invention solves the problem of providing the proper DC bias voltage to the microphone to be connected to the audio input of an external device. The proper voltage is ensured because the microphone is that of the telephone handset, and the DC voltage is that produced by the telephone base, which is designed to operate properly with that handset.

As noted above, the telephone handset connector may also include an output, and the device audio connector may also include an input. The handset may thus be used to provide two-way voice communications with the external device.

The present invention may also include a device data connector and a switching circuit. The switching circuit monitors the device data connector and determines whether the external device is in a mode in which it is ready to communicate data. For example, if the external device is a voice-over-data modem, the switching circuit monitors the modem to determine whether it is in the on-hook state or the off-hook state by sensing current at the data connector.

When the external device is not in a data communication mode, e.g., if the device is a modem and it is on-hook, the switching circuit forms direct electrical connection between the telephone handset connector and the telephone base connector and breaks the connections between the telephone handset connector and the device voice connector. When the external device is in a data communication mode, e.g., the modem goes off-hook, the switching circuit breaks the direct connection between the telephone handset connector and the telephone base connector and forms the circuit described above, in which the handset microphone receives a DC bias voltage from the telephone base but is isolated from the telephone base at audio frequencies.

Those skilled in the art will understand that, although the present invention is particularly advantageous for interfacing a voice-over-data modem to a telephone instrument, the external devices with which the present invention may be used are not limited to modems. For example, in a computer that has an audio input, i.e., a so-called multimedia computer system, the present invention allows a user to connect a telephone handset to the audio input.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
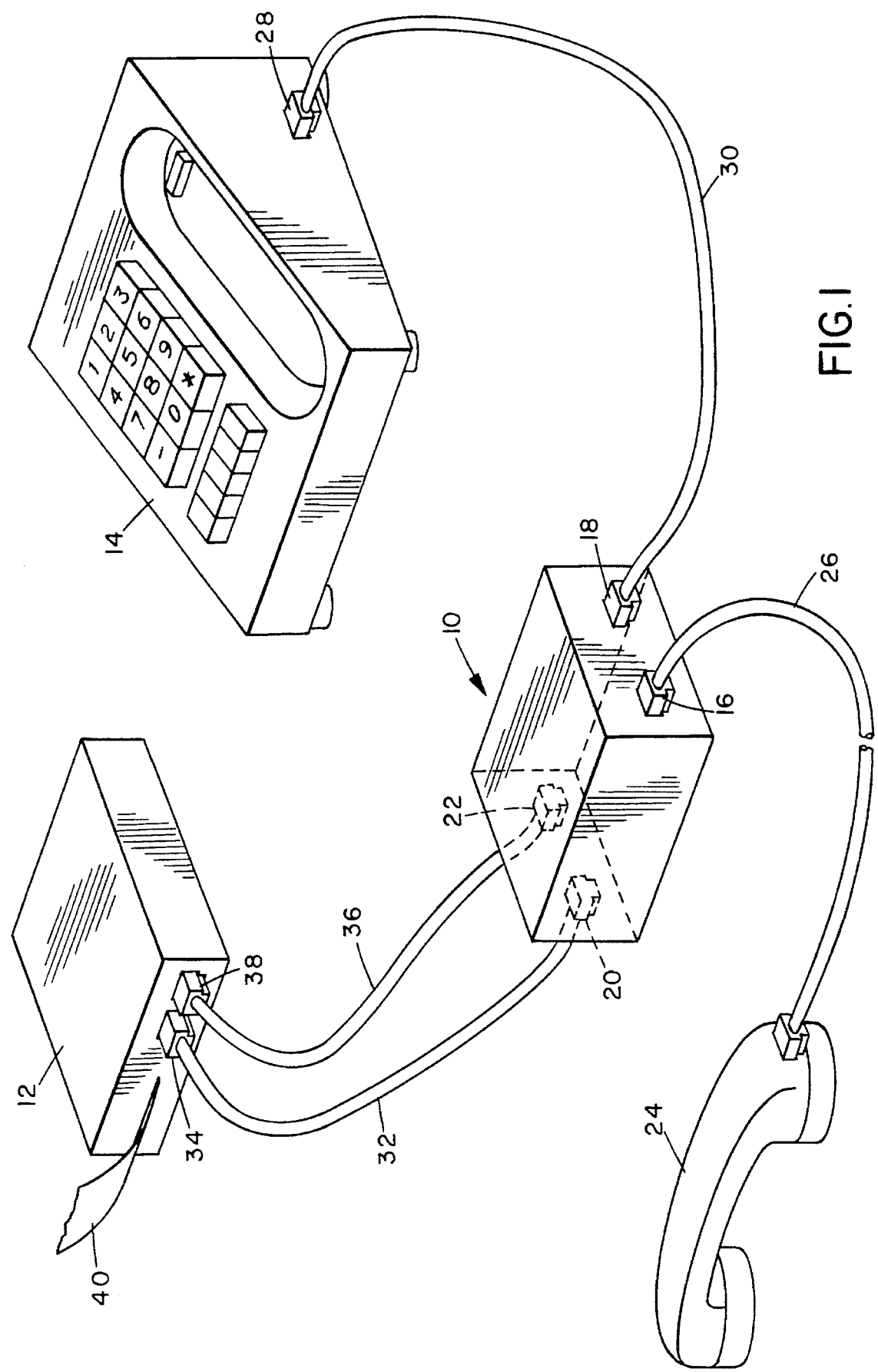
FIG. 1 is a perspective view of a telephone instrument connected via its handset jack to a voice-over-data modem using the present invention.

As illustrated in FIG. 1, the interface 10 of the present invention may be used to connect a voice-over-data modem 12 to a telephone instrument 14. Interface 10 has an interface handset jack 16, an interface base jack 18, an interface voice jack 20 and an interface data jack 22. Although these connectors are referred to herein as "jacks" for illustrative purposes, it should be noted that any or all of them could be plugs or any other suitable type of connector. Interface handset jack 16 and interface base jack 18 are, however, preferably RJ-11 connectors to enable connection to the handset and base, respectively, of typical telephone instruments.

To use the present invention, a user unplugs the handset cable 26 from the telephone base jack 28 and plugs handset cable 26 into interface handset jack 16 of interface 10. The user also plugs the respective ends of a base cable 30 into telephone base jack 28 and interface base jack 18. In addition, the user plugs the respective ends of a voice cable 32 into the modem voice jack 34 and the interface voice jack 20 and plugs the respective ends of a data cable 36 into the modem data jack 38 and the interface data jack 22. Modem 12 is connected to a computer (not shown) via a data communication cable 40. Although modem 12 in this exemplary embodiment is a so-called external modem, it should be understood that modem 12 could be an internal modem that is housed within the computer and connected directly to the computer data bus.

When interface 10 is connected in the manner shown in FIG. 1, the user's computer can send and receive data over a telephone connection while the user simultaneously speaks or listens via handset 24 to the party on the other end of the telephone connection. As described below in further detail with respect to FIG. 2, interface 10 provides the optimal DC bias voltage to the microphone element (not shown) of handset 24. The voltage is optimal because interface 10 obtains this voltage from the telephone base jack 28; the voltage is the same as handset 24 would receive were it plugged directly into telephone base jack 28.

Figure 2:
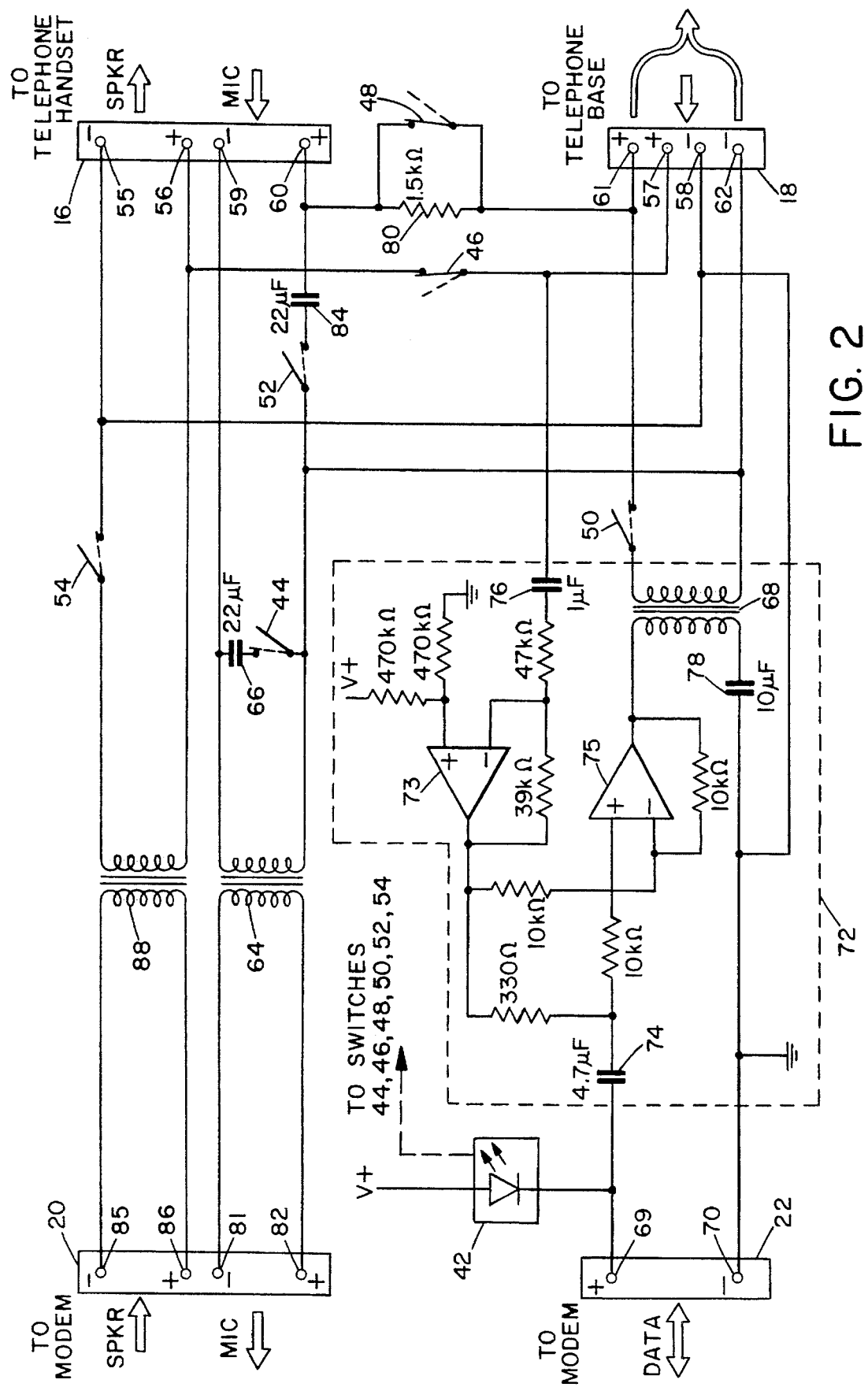
FIG. 2 is a schematic diagram of a circuit for connecting a voice-over-data modem to a telephone instrument handset jack.

As illustrated in FIG. 2, interface 10 includes a switching circuit for routing the DC voltage at telephone base jack 28 to handset 24 while isolating the AC audio-frequency signals present at telephone base jack 28 and at handset 24 from one another. The switching circuit also electrically disconnects modem 12 from telephone instrument 14, including handset 24, when modem 12 is in the on-hook state and directly connects handset 24 to the telephone instrument base. When modem 12 is in the on-hook state, telephone 14 may be used in the normal manner for voice-only communication.

The switching circuit includes an optical relay switch 42 having six individual switch contact pairs that open or close in response to current at data jack 22. Such current will exist when modem 12 goes off-hook in preparation for sending or receiving data. When modem 12 is on-hook, switch contact pair 44 is closed, switch contact pair 46 is closed, switch contact pair 48 is closed, switch contact pair 50 is open, switch contact pair 52 is open, and switch contact pair 54 is open. When modem 12 goes off-hook, switch contact pairs 44, 46, 48, 50, 52 and 54 change to the positions shown in dashed line in FIG. 2. Although an optical relay is preferred, it should be noted that a magnetic relay or other type of electronically controlled switch would be suitable.

When modem 12 is on-hook, the handset speaker terminals 55 and 56 of interface handset jack 16 are electrically connected directly to the base speaker terminals 57 and 58 of interface base jack 18 via switch contact pair 46, and handset speaker terminals 55 and 56 are disconnected from modem 12 via switch contact pair 54. Similarly, when modem 12 is on-hook, the handset microphone terminals 59 and 60 of interface handset jack 16 are electrically connected to the base microphone terminals 61 and 62 of interface base jack 18 via switch contact pairs 44 and 48 and via the winding on the interface side of the microphone isolation transformer 64, which is in parallel with a switch contact pair 44. Switch contact pair 44 maintains a capacitor 66 in parallel with the winding on the interface side of transformer 64 to reduce signal losses due to poor impedance matching between the transformer winding and the microphone element of handset 24. The most common commercially available handsets use a high-impedance microphone element. If the impedance at base speaker terminals 57 and 58 is sufficiently high, capacitor 66 and switch contact pair 44 need not be included in the circuit.

When modem 12 goes off-hook, switch contact pair 50 closes and thus connects the winding on the base side of the data isolation transformer 68 to base microphone terminals 61 and 62. The modem data terminals 69 and 70 are connected to the winding on the modem side of transformer 68 via a two-wire-to-four-wire converter circuit 72. Converter circuit 72 comprises two amplifier circuits, which comprise two op-amps 73 and 75 and associated resistors. Current at modem data terminals 69 and 70 can reach relay switch 42, but DC blocking capacitors 74, 76 and 78 isolate converter circuit 72. Converter circuit 72 couples audio-frequency data signals received from modem data terminals 69 and 70 to base speaker terminals 57 and 58 via data isolation transformer 68. Similarly, converter circuit 72 couples audio-frequency data signals received from base microphone terminals 61 and 62 to modem data terminals 69 and 70 via data isolation transformer 68.

When modem 12 goes off-hook, switch contact pair 46 opens and breaks the connection between handset speaker terminals 55 and 56 and base speaker terminals 57 and 58. Switch contact pair 48 also opens. Nevertheless, a resistor 80 is in parallel with switch contact pair 48. Resistor 80 does not significantly affect the DC voltage between base microphone terminals 61 and 62 and handset microphone terminals 59 and 60, but its relatively high impedance (preferably about 1 k$\Omega$ to 1.5 k$\Omega$) diverts the overwhelming portion of the audio-frequency current in the winding on the base side of data isolation transformer 68 to base microphone terminals 61 and 62.

The microphone element of handset 24 may be used to provide a voice input to voice-over-data modem 12. Not only does the microphone element receive the necessary DC bias voltage, as described above, but it is also connected via an AC path to the modem microphone terminals 81 and 82. The closure of switch contact pair 52 completes an AC path through the winding on the handset side of microphone isolation transformer 64 and through a capacitor 84. The voice signal from handset microphone terminals 59 and 60 is thus coupled via transformer 64 to modem microphone terminals 81 and 82. The impedance of resistor 80 is low in relation to that of capacitor 84 at typical audio frequencies. For example, capacitor 84, which preferably has a value of about 22 μF., has a low impedance at 1 kHz in relation to a 1 kΩ to 1.5 kΩ resistor. The relatively high impedance of resistor 80 blocks the overwhelming portion of the current in the AC path described above. Speaking into the microphone element of handset 24 thus does not interfere with data (or data with voice overlay) received simultaneously at base microphone terminals 61 and 62.

The speaker element of handset 24 may be used as the voice output from voice-over-data modem 12. Audio signals received at the modem speaker terminals 85 and 86 are coupled to handset speaker terminals 55 and 56 via a speaker isolation transformer 88 because switch contact pair 54 is closed.

Transformers 64, 68 and 88 provide ground isolation between the respective grounds of voice-over-data modem 12 (and the computer to which it is connected) and the telephone line.

As described above, capacitor 84 and resistor 80 together form a frequency-sensitive network or filter. In other embodiments, however, such a network may be formed by any suitable combination of active or passive, analog or digital components. For example, an inductor may be used in place of resistor 80.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. An interface between an external device having data and audio inputs and outputs and a telephone instrument, said interface comprising:

a telephone base input connection for receiving signals from said telephone instrument;

a telephone base output connection for providing signals to said telephone instrument;

a telephone handset input connection for receiving signals from a telephone handset;

a telephone handset output connection for providing audio signals to a telephone handset;

a device audio input connection for receiving audio signals from said external device;

a device audio output connection for providing audio signals to said external device;

a device data connection for communicating data signals with said external device; and a filter circuit for forming an audio-frequency path between said telephone handset input connection and said device audio output connection and between said telephone handset output connection and said device audio input connection, for forming a DC path between said telephone handset input connection and said telephone base output connection, for attenuating an audio-frequency path between said telephone handset input connection and said telephone base output connection, and for attenuating an audio-frequency path between said telephone handset output connection and said telephone base input connection.

2. The interface between an external device and a telephone instrument claimed in claim 1, further comprising a switching circuit for forming direct electrical connections between said telephone handset input connection and said telephone base output connection and between said telephone handset output connection and said telephone base input connection when said device is not in a data communication mode.

3. The interface between an external device and a telephone instrument claimed in claim 2, wherein said switching circuit is responsive to current in said device data connection.

4. The interface between an external device and a telephone instrument claimed in claim 2, wherein said external device is a voice-over-data modem, and said switching circuit determines whether said modem is in an on-hook state or an off-hook state.

5. The interface between an external device and a telephone instrument claimed in claim 2, wherein said switching circuit comprises an optical relay.

6. The interface between an external device and a telephone instrument claimed in claim 1, wherein said filter circuit comprises a capacitor connected between said telephone handset input connection and said telephone base output connection.

7. The interface between an external device and a telephone instrument claimed in claim 6, wherein said filter circuit further comprises a resistor connected between said telephone handset input connection and said telephone base output connection, and a terminal of said telephone handset output connection is connected to both said resistor and said capacitor.

8. The interface between an external device and a telephone instrument claimed in claim 1, further comprising:

a first transformer between said device audio input connection and said telephone handset output connection;

a second transformer between said device audio output connection and said telephone handset input connection; and a third transformer between said device data connection and said telephone base output connection.

9. An interface between an external device having data and audio inputs and outputs and a telephone instrument, said interface comprising:

a telephone base input connection for receiving signals from said telephone instrument, said telephone base input connection having first and second terminals;

a telephone base output connection for providing signals to said telephone instrument, said telephone base output connection having first and second terminals;

a telephone handset input connection for receiving audio signals from a telephone handset, said telephone handset input connection having first and second terminals;

a telephone handset output connection for providing audio signals to a telephone handset, said telephone handset output connection having first and second terminals;

a device audio input connection for receiving audio signals from said external device, said device audio input connection having first and second terminals;

a device audio output connection for providing audio signals to said external device, said device audio output connection having first and second terminals;

a device data connection for communicating data signals with said external device; and a relay circuit having a trigger connected to said device data connection and having first and second switches, said first and second switches opening in response to current in said device data connection;

first impedance means for providing an impedance inversely related to frequency;

second impedance means for providing a large impedance relative to said impedance of said first impedance means at audio frequencies;

said first switch connected in parallel with said second impedance means between said first terminal of said telephone handset input connection and said first terminal of said telephone base output connection; and said second switch connected in series with said first impedance means between said first terminal of said telephone handset input connection and said first terminal of said device audio input connection, said second terminal of said telephone handset input connection connected to said second terminal of said device audio input connection.

10. The interface between an external device and a telephone instrument claimed in claim 9, wherein said first impedance means comprises a capacitor and said second impedance means comprises a resistor.

11. The interface between an external device and a telephone instrument claimed in claim 9, further comprising a converter circuit having a bidirectional connection connected to said device data connection, a converter input connected to said telephone base input connection and a converter output connected to said telephone base output connection.

12. The interface between an external device and a telephone instrument claimed in claim 11, wherein said relay circuit further comprises third, fourth and fifth switches, said third switch connected between said telephone handset output connection and said telephone base input connection and opening in response to current in said device data connection, said fourth switch connected between said converter output and said telephone base output connection and closing in response to current in said device data connection, said fifth switch connected between said telephone handset output connection and said device audio input connection and closing in response to current in said device data connection.

13. The interface between an external device and a telephone instrument claimed in claim 12, further comprising first, second and third transformers, said first transformer connected between said converter output and said telephone base output connection, said second transformer connected between said device audio output connection and said telephone handset input connection, said third transformer connected between said device audio input connection and said telephone handset output connection.

14. The interface between an external device and a telephone instrument claimed in claim 13, further comprising an impedance matching capacitor and wherein said relay circuit further comprises a sixth switch, said sixth switch and said impedance matching capacitor connected in series with one another and across said primary winding of said second transformer, said secondary winding of said second transformer connected across said device audio output connection, said fourth switch opening in response to current in said device data connection.

15. A method for interfacing a voice-over-data modem to a telephone instrument, comprising the steps of:

enabling a first signal path between a telephone handset input and said voice-over-data modem voice input, said first signal path passing audio frequency signals and blocking direct current signals;

enabling a second signal path between a telephone handset input and said voice-over-data modem voice input, said second signal path passing direct current signals and blocking audio frequency signals; and enabling a third signal path between a telephone base connection and a voice-over-data modem data connection.

16. The method for interfacing a voice-over-data modem to a telephone instrument claimed in claim 15, further comprising the steps of:

detecting when said voice-over-data modem is in an on-hook state;

disabling said first and second signal paths and enabling said third signal path when said voice-over-data modem is in said on-hook state;

enabling a fourth signal path between said telephone handset input and said telephone base output when said voice-over-data modem is in said on-hook state; and enabling a fifth signal path between said telephone handset output and said telephone base input when said voice-over-data modem is in said on-hook state.

* * * * *